(12) United States Patent
Pickford

(10) Patent No.: US 9,326,537 B2
(45) Date of Patent: *May 3, 2016

(54) MICROWAVEABLE COATED FOOD PRODUCT, AND METHOD AND APPARATUS FOR THE MANUFACTURE THEREOF

(75) Inventor: Keith Graham Pickford, Manchester (GB)

(73) Assignee: Crisp Sensation Holding S.A., Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/015,491

(22) Filed: Jan. 27, 2011

(65) Prior Publication Data

US 2012/0196004 A1    Aug. 2, 2012

(51) Int. Cl.
| A21D 13/00 | (2006.01) |
| A23L 1/01 | (2006.01) |
| A23L 1/00 | (2006.01) |
| A23P 1/08 | (2006.01) |

(52) U.S. Cl.
CPC .............. *A23L 1/0128* (2013.01); *A23L 1/005* (2013.01); *A23L 1/0076* (2013.01); *A23P 1/082* (2013.01); *A23P 2001/088* (2013.01)

(58) Field of Classification Search
USPC .......................................................... 426/95
See application file for complete search history.

(56) References Cited

U.S. PATENT DOCUMENTS

| 2,446,175 A | 8/1948 | Gerber |
| 3,067,921 A | 12/1962 | Reifers |
| 3,052,545 A | 9/1963 | Ducharme et al. |
| 3,208,851 A | 9/1965 | Antinori et al. |
| 3,251,531 A | 5/1966 | Hook et al. |
| 3,399,062 A | 8/1968 | Willard, Jr. et al. |
| 3,486,904 A | 12/1969 | Ziegler |
| 3,586,512 A | 6/1971 | Mancuso et al. |
| 3,597,227 A | 8/1971 | Murray et al. |
| 3,619,208 A | 11/1971 | Bahoshy et al. |
| 3,656,969 A | 4/1972 | Horn |
| RE27,531 E | 12/1972 | Murray et al. |

(Continued)

FOREIGN PATENT DOCUMENTS

| CA | 980164 | 12/1975 |
| DE | 2220528 | 12/1972 |

(Continued)

OTHER PUBLICATIONS

Kutz, Lynn. "The Great Cover Up: Batters, Breadings and Coatings" Apr. 1997.*

(Continued)

*Primary Examiner* — D Lawrence Tarazano
*Assistant Examiner* — Katherine D Leblanc
(74) *Attorney, Agent, or Firm* — Price Heneveld LLP

(57) ABSTRACT

A frozen, microwaveable, coated food product comprising:
- a core of cooked edible material having a weight equal to 15-95 wt. % of the food product;
- a fried coating that envelops the core of edible material and has a weight equal to 5-85 wt. % of the total weight of the food product, said coating comprising at least three coating layers, including an inner crumb layer, an outer crumb layer and a batter layer that separates the inner crumb layer from the outer crumb layer;
- wherein both the inner crumb layer and the outer crumb layer comprise a milled farinaceous dough extrudate containing 0.05-5 wt. % of added hydrocolloid.

20 Claims, 4 Drawing Sheets

(56) References Cited

U.S. PATENT DOCUMENTS

| | | |
|---|---|---|
| 3,751,268 A | 8/1973 | van Patten et al. |
| 3,857,976 A | 12/1974 | Szymanski et al. |
| 3,899,602 A | 8/1975 | Rutenberg et al. |
| 3,904,429 A | 9/1975 | Eastman et al. |
| 3,904,601 A | 9/1975 | Tessler et al. |
| 3,915,532 A | 10/1975 | Ashton |
| 3,956,515 A | 5/1976 | Moore et al. |
| 3,969,340 A | 7/1976 | Tessler et al. |
| 3,970,767 A | 7/1976 | Tessler et al. |
| 4,020,564 A | 5/1977 | Bayliss |
| 4,068,009 A | 1/1978 | Rispoli et al. |
| 4,192,900 A | 3/1980 | Cheng |
| 4,208,442 A | 6/1980 | Evans et al. |
| 4,218,485 A | 8/1980 | Lee et al. |
| 4,260,637 A | 4/1981 | Rispoli et al. |
| 4,308,286 A | 12/1981 | Anstett et al. |
| 4,342,788 A | 8/1982 | Chatfelter |
| 4,364,961 A | 12/1982 | Darley et al. |
| 4,393,088 A | 7/1983 | Matsusaka |
| 4,415,599 A | 11/1983 | Bos |
| 4,423,078 A | 12/1983 | Darley et al. |
| 4,427,706 A | 1/1984 | El-Hag |
| 4,440,793 A | 4/1984 | Seki |
| 4,568,550 A | 2/1986 | Fulger et al. |
| 4,568,555 A | 2/1986 | Spanier |
| 4,588,600 A | 5/1986 | Suderman |
| 4,597,974 A | 7/1986 | Fonteneau et al. |
| 4,609,557 A * | 9/1986 | Mao et al. ............... 426/549 |
| 4,609,558 A | 9/1986 | Giacone et al. |
| 4,623,552 A | 11/1986 | Rapp |
| 4,767,637 A | 8/1988 | Ek |
| 4,778,684 A | 10/1988 | D'Amico et al. |
| 4,864,089 A | 9/1989 | Tighe et al. |
| 4,877,628 A | 10/1989 | Stypula |
| 4,908,487 A | 3/1990 | Sarnoff et al. |
| 4,913,918 A | 4/1990 | Stypula |
| 4,915,970 A | 4/1990 | Coffey |
| 4,916,831 A | 4/1990 | Yasumura et al. |
| 4,943,438 A | 7/1990 | Rosenthal |
| 4,948,608 A | 8/1990 | Stypula et al. |
| 4,978,541 A | 12/1990 | Stypula et al. |
| 5,049,711 A | 9/1991 | August |
| 5,057,329 A | 10/1991 | Stypula et al. |
| 5,088,179 A | 2/1992 | Gibbon |
| 5,093,176 A | 3/1992 | Pribonic et al. |
| 5,175,010 A | 12/1992 | Roig et al. |
| 5,202,138 A | 4/1993 | Stypula et al. |
| H1229 H | 9/1993 | McGinley et al. |
| 5,266,340 A | 11/1993 | Samson et al. |
| 5,281,432 A | 1/1994 | Zallie et al. |
| 5,308,636 A | 5/1994 | Tye et al. |
| 5,310,977 A | 5/1994 | Stenkamp et al. |
| 5,310,980 A | 5/1994 | Beckett et al. |
| 5,321,900 A | 6/1994 | Meyer |
| 5,350,585 A | 9/1994 | Sunderland |
| 5,423,477 A | 6/1995 | Valdman et al. |
| 5,431,944 A | 7/1995 | Melvej |
| 5,433,966 A | 7/1995 | Wolt et al. |
| 5,492,707 A | 2/1996 | Chalupa et al. |
| 5,523,102 A | 6/1996 | Morasch |
| 5,565,132 A | 10/1996 | Sayler |
| 5,601,861 A | 2/1997 | Gerrish et al. |
| 5,736,178 A | 4/1998 | Cook et al. |
| 6,097,017 A | 8/2000 | Pickford |
| 6,214,403 B1 | 4/2001 | Broberg et al. |
| 6,261,625 B1 | 7/2001 | Pickford |
| 6,287,621 B1 | 9/2001 | Lacourse et al. |
| 6,288,179 B1 | 9/2001 | Baur et al. |
| 6,326,599 B1 | 12/2001 | Pickford |
| 6,399,130 B2 | 6/2002 | Parker |
| 6,413,562 B2 | 7/2002 | Conforti et al. |
| 6,458,404 B1 | 10/2002 | Adachi |
| 6,503,546 B1 | 1/2003 | Ferrari-Philippe et al. |
| 6,613,370 B1 | 9/2003 | Pickford |
| 6,620,447 B1 | 9/2003 | Paukkunen et al. |
| 7,147,885 B2 | 12/2006 | Asano et al. |
| 8,728,554 B2 | 5/2014 | Pickford |
| 8,765,202 B2 | 7/2014 | Pickford |
| 2001/0014363 A1 | 8/2001 | Parker |
| 2001/0024672 A1 | 9/2001 | Kondou et al. |
| 2001/0055641 A1 | 12/2001 | Conforti et al. |
| 2002/0039615 A1 | 4/2002 | Adachi |
| 2002/0119226 A1 | 8/2002 | Conforti et al. |
| 2002/0192332 A1 | 12/2002 | Pickford |
| 2003/0147998 A1* | 8/2003 | Geng et al. ............... 426/94 |
| 2003/0198711 A1 | 10/2003 | Pickford |
| 2004/0213883 A1 | 10/2004 | Sadek et al. |
| 2005/0169099 A1 | 8/2005 | Sprinkle |
| 2006/0053650 A1 | 3/2006 | Manack et al. |
| 2006/0286240 A1 | 12/2006 | Roosjen |
| 2011/0091612 A1 | 4/2011 | Pickford |
| 2011/0177200 A1 | 7/2011 | Pickford |
| 2011/0177210 A1 | 7/2011 | Pickford |
| 2011/0177211 A1 | 7/2011 | Pickford |
| 2012/0196005 A1 | 8/2012 | Pickford |
| 2012/0288592 A1 | 11/2012 | Pickford |
| 2013/0156925 A1 | 6/2013 | Pickford |
| 2014/0093615 A1 | 4/2014 | Pickford |

FOREIGN PATENT DOCUMENTS

| | | |
|---|---|---|
| DE | 2338180 | 2/1975 |
| EP | 17338 | 10/1980 |
| EP | 109226 | 5/1984 |
| EP | 155760 | 9/1985 |
| EP | 327332 | 8/1989 |
| EP | 344726 | 12/1989 |
| EP | 392119 | 10/1990 |
| EP | 510320 | 2/1992 |
| EP | 273475 | 3/1992 |
| EP | 648433 | 10/1994 |
| EP | 1929887 | 6/2008 |
| EP | 2207434 | 8/2011 |
| EP | 2359697 | 8/2011 |
| EP | 2374361 | 10/2011 |
| EP | 2481294 | 8/2012 |
| EP | 2481295 | 8/2012 |
| FR | 2337534 | 8/1977 |
| FR | 2343668 | 10/1997 |
| GB | 1419455 | 12/1975 |
| GB | 2226220 | 11/1988 |
| JP | 57-159451 | 10/1982 |
| JP | 01-168242 | 7/1989 |
| WO | 85/01188 | 3/1985 |
| WO | 88/06007 | 8/1988 |
| WO | 88/06847 | 9/1988 |
| WO | 89/08549 | 9/1989 |
| WO | 92/01384 | 2/1992 |
| WO | 93/03634 | 3/1993 |
| WO | 93/06752 | 4/1993 |
| WO | 93/14995 | 8/1993 |
| WO | 94/13160 | 6/1994 |
| WO | 94/19917 | 9/1994 |
| WO | 94/27887 | 12/1994 |
| WO | 95/07629 | 3/1995 |
| WO | 95/23523 | 9/1995 |
| WO | 95/24110 | 9/1995 |
| WO | 95/30344 | 11/1995 |
| WO | 96/02149 | 2/1996 |
| WO | 96/22228 | 7/1996 |
| WO | 96/32026 | 10/1996 |
| WO | 96/38054 | 12/1996 |
| WO | 97/03572 | 2/1997 |
| WO | 97/29653 | 8/1997 |
| WO | 98/08399 | 3/1998 |
| WO | 99/44439 | 9/1999 |
| WO | 2005/112664 | 12/2005 |
| WO | 2006/030333 | 3/2006 |
| WO | 2006/082804 | 8/2006 |
| WO | 2008/078997 | 7/2008 |
| WO | 2010/001101 | 1/2010 |

OTHER PUBLICATIONS

Food Safety.gov "Minimum Cooking Temperatures" Oct. 18, 2009.*

(56) References Cited

OTHER PUBLICATIONS

Fish Fillet. USDA Nutrient Database. Retrieved Jan. 11, 2015 http://ndb.nal.usda.gov/ndb/foods/show/6928.*
Fried Chicken Breast. Retrieved Jan. 11, 2015 http://ndb.nal.usda.gov/ndb/foods/show/6634?fg=&man=&lfacet=&format=&count=&max=25&offset=&sort=&qlookup=fried+fish+with+breading.*
Altschul, A.M., "Low-calorie foods handbook", Georgetown University School of Medicine, Marcel Dekker, Inc., Jul. 29, 1993, pp. 1-10.
Albert, A. et al., "Adhesion in fried battered nuggets: Performance of different hydrocolloids as predusts using three cooking procedures", Food Hydrocolloids 23 (2009) 1443-1448.
Henderson, A., "Cellulose ethers—the role of thermal gelation", Dow Chemical Europe, CH-8810 Horgen, Switzerland, 1988, pp. 265-275.
WO application No. PCT/GB96/01685, International Search Report mailed Oct. 29, 1996.
WO application No. PCT/GB97/00924, International Search Report mailed Jul. 30, 1997.
WO application No. PCT/GB99,00564, International Search Report mailed Jun. 29, 1999.
WO application No. PCT/GB92/01559, International Search Report mailed Dec. 30, 1992.
WO application No. PCT/GB95/00958, International Search Report mailed Aug. 22, 1995.
WO patent application No. PCT/GB2011/050060, International Search Report and Written Opinion mailed May 23, 2011.
U.S. Appl. No. 09/000,319, Office Action mailed Feb. 3, 1999.
U.S. Appl. No. 09/000,319, Office Action mailed Mar. 27, 2000.
U.S. Appl. No. 09/381,848, Office Action mailed Sep. 26, 2000.
U.S. Appl. No. 09/381,848, Office Action mailed May 8, 2001.
U.S. Appl. No. 09/646,068, Office Action mailed May 8, 2002.
U.S. Appl. No. 09/646,068, Office Action mailed Feb. 4, 2003.
EP patent application No. 11152421.1, Extended Search Report mailed Jul. 5, 2011.
EP patent application No. 11152415.3, Extended Search Report mailed Jul. 5, 2011.
U.S. Appl. No. 13/015,486, "Production of microwaveable coated food products", Keith Graham Pickford, filed Jan. 27, 2011.
U.S. Appl. No. 13/107,814, "Microwaveable batter", Keith Graham Pickford, filed May 13, 2011.
U.S. Appl. No. 13/015,486, Office Action mailed Feb. 19, 2013.
U.S. Appl. No. 12/764,428, Office Action mailed Mar. 22, 2013.
U.S. Appl. No. 12/764,421, Office Action mailed Apr. 1, 2013.
U.S. Appl. No. 12/764,407, Office Action mailed Apr. 5, 2013.
U.S. Appl. No. 13/331,900, Office Action mailed Apr. 10, 2013.
EP patent application No. 12178463, European Search Report mailed Jan. 22, 2013.
WO patent application No. PCT/EP2012/076015, International Search Report and Written Opinion mailed May 7, 2013.
U.S. Appl. No. 13/107,814, Office Action mailed Jun. 21, 2013.
U.S. Appl. No. 12/669,953, Notice of Allowance mailed Jul. 25, 2013.
EP patent application No. 11163536.3, Communication under Rule 71(3) EPC, Intent to Grant, mailed May 30, 2013.
WO patent application No. PCT/GB2011/050057, International Search Report mailed May 23, 2011.
WO patent application No. PCT/GB2011/050055, International Search Report and Written Opinion mailed May 20, 2011.
U.S. Appl. No. 13/331,900, "Crumb Manufacture", Pickford et al., filed Dec. 20, 2011.
U.S. Appl. No. 12/764,428, Office Action mailed Jan. 5, 2012.
U.S. Appl. No. 12/764,428, Office Action mialed Jun. 21, 2012.
U.S. Appl. No. 12/764,407, Office Action mailed Oct. 5, 2012.
U.S. Appl. No. 12/764,421, Office Action mailed Oct. 9, 2012.
U.S. Appl. No. 13/015,486, Office Action mailed Oct. 12, 2012.
WO patent application No. PCT/GB2009/001617, Search Report and Written Opinion mailed Jul. 1, 2008.
EP patent application No. 09772781.2, Communication under Rule 71(3) EPC, intent to grant, maliled Mar. 14, 2011.
U.S. Appl. No. 13/331,900, Office Action mailed Dec. 7, 2012.
Clextral Press Release: New drying technology provides optimal drying for complex products and reduces energy expense, Clextral—a division of Groupe Legris Industries, Jun. 2009.
Clextral Rotante Evolum dryer—new generation for sustainable development, Clextral—a division of Groupe Legris Industries, Jun. 2009.
EP patent application No. 1119483.6, Extended European Search Report mailed Aug. 10, 2012.
Perten, Harald, "Application of the falling number method for evaluating alpha-amylase activity," Cereal Chemistry, vol. 41, May 1964, pp. 127-140.
English translation of Paris GDS Moulins FR 2,458,227, Jan. 1981.
Edwards, W.P., "The Science of Bakery Products," Chapter 7—Raw Materials, The Royal Society of Chemistry, 2007.
English translation of Wiedmann et al., EP 0510320A1, Oct. 1992, downloaded from http://translationportal.epo.org on Jan. 25, 2013.
"Criteria for Judging Quality," published Jun. 20, 2008, downloaded from http://web.archive,org/web/20080620034754http://www.theartisan.net/flour_criteria_judging.htm on Jan. 25, 2013.
English translation of RU 2277438, Rye-wheat bread and its proI3vodstva, Berestnev et al., Jun. 10, 2006.
U.S. Appl. No. 12/764,407, Office Action mailed Oct. 25, 2013.
U.S. Appl. No. 14/105,847, "Stabilized Cheese Products," van der Kolk et al., filed Dec. 13, 2013.
U.S. Appl. No. 13/015,486, Office Action mailed Jan. 6, 2014.
U.S. Appl. No. 12/764,407, Notice of Allowance mailed Feb. 12, 2014.
U.S. Appl. No. 13/107,814, Office Action mailed Feb. 13, 2014.
U.S. Appl. No. 14/170,371, "Microwaveable Batter," Wilhelmus Johannes Gerardus Michiels et al., filed Jan. 31, 2014.
U.S. Appl. No. 14/029,681, Office Action mailed Apr. 2, 2014.
U.S. Appl. No. 12/764,421, Notice of Allowance mailed Apr. 11, 2014.
U.S. Appl. No. 14/249,250, "Stabilisation of microwave heated food substrates," Keith Graham Pickford, filed Apr. 9, 2014.
U.S. Appl. No. 14/266,611, "Coated stabilized microwave heated foods," Keith Graham Pickford, filed Apr. 30, 2014.
U.S. Appl. No. 14/032,881, "Microwaveable Batter," Keith Graham Pickford, filed Sep. 20, 2013.
U.S. Appl. No. 13/015,486, Office Action mailed Jul. 1, 2014.
U.S. Appl. No. 13/953,585, Office Action mailed Jul. 8, 2014.
U.S. Appl. No. 14/458,051, "Microwaveable Batter," Keith Graham Pickford, filed Aug. 12, 2014.

* cited by examiner

MICROWAVEABLE COATED FOOD PRODUCT, AND METHOD AND APPARATUS FOR THE MANUFACTURE THEREOF

TECHNICAL FIELD OF THE INVENTION

This invention relates to coated food products which may be cooked or reheated using a microwave oven or using a combined microwave and conventional over, referred to collectively in this specification as a microwave oven. The invention relates particularly but not exclusively to crumb coated products, particularly chicken nuggets or other products wherein a meat, fish, poultry, vegetable, fruit, fungus materials or dairy products substrate is coated with a batter coating and two or more layers of crumb, wherein the products may be cooked or reheated from a frozen state using a microwave oven or a combined microwave or conventional oven.

The invention also relates to a method of manufacturing such a microwaveable coated food product and to an apparatus for carrying out such method.

BACKGROUND OF THE INVENTION

Use of a microwave or combination oven for cooking or reheating coated products is problematic because the substrate is heated from the inside by the microwave radiation generating steam which may damage the batter and crumb coatings. Conventional coated products are therefore unsuitable for use in microwave or combination ovens.

Many food materials, for example natural muscle of poultry, fish or red meat or vegetable or processed foods contain a large percentage of water. Most fresh foods contain more than 60% water. Some of this water is bound, that is tightly attached to the constituent cells. The remaining mobile water is available and can be frozen. If a food product is frozen to a core temperature of between $-1°$ C. and $-30°$ C. or lower and is placed and irradiated in a microwave oven, the microwave energy will be primarily absorbed by the frozen available water. Whereas in conventional cooking heat is applied from the exterior, in microwave cooking heat is generated from within. The process of heating can be very rapid so that available water is converted into steam. When a food product is allowed to stand after heating in a microwave oven, water can continue to be expelled from the product. This is particularly noticeable for example when heating frozen fish muscle. The loss of water causes any food coating, particularly a batter, pastry or breadcrumb coating to become soggy and unpalatable. In addition the core of the substrate may become dry due to the loss of water.

WO 93/03634 describes a method of producing a coated foodstuff which may be reheated by microwave irradiation, the method comprising: applying to the foodstuff a predust; applying a batter to the predusted foodstuff; frying the battered foodstuff, and cooling the fried product.

WO 95/30344 describes a process for microwaveable coated food products comprising the steps of predust application, batter application, crumb application, flash frying, freezing and packaging.

WO 97/03572 describes a process for microwaveable coated food products, such as chicken nuggets, comprising the steps of predust application, batter application, crumb application, flash frying, freezing and packaging.

WO 2010/001101 describes a method of manufacture of a crumb coated food product comprising the steps of: forming an aqueous mixture comprising: flour, sodium bicarbonate, optional additives and water; adding the mixture into an extruder; adding an aqueous gelling agent to the extruder; extruding the resultant mixture at a temperature greater than $100°$ C. to form an expanded porous product; drying the product, and milling the dried product to form a crumb. The crumb so obtained is particularly suitable for use in the preparation of coated food products that are cooked or reheated from a frozen state using a microwave oven.

SUMMARY OF THE INVENTION

The present invention relates to a method for the production of a frozen coated food product that can be reheated or cooked in a microwave oven to produce a ready-to-eat product with outstanding sensory properties, especially a crunchy coating in combination with a succulent moist core. The present method employs a batter and an innovative crumb that is applied in two separate layers separated by a batter layer. The crumb is a milled farinaceous dough extrudate containing 0.05-5 wt. % of added hydrocolloid.

According to the first aspect of the invention there is provided a frozen, microwaveable, coated food product comprising:

a core of cooked edible material having a weight equal to 15-95 wt. % of the food product, a fried coating that envelops the core of edible material and that having weight equal to 5-85 wt. % of the food product, said coating comprising at least three coating layers, including an inner crumb layer, an outer crumb layer and a batter layer that separates the inner crumb layer from the outer crumb layer;

wherein both the inner crumb layer and the outer crumb layer comprise a milled farinaceous dough extrudate containing 0.05-5 wt. % of added hydrocolloid.

According to a second aspect of the present invention there is provided a method of producing a frozen, microwaveable, coated food product, the method comprising the steps of:

providing a portion of a solid or solidified substrate;

coating the portion with an aqueous precoating liquid to form a precoated portion;

applying a coating of bonding crumb to the precoated portion to form a crumb coated portion;

applying a batter to the crumb coated portion to form a batter coated portion; applying a coating of coating crumb to the batter coated portion to form a breaded portion;

frying the breaded portion by contacting the breaded portion for at least 100 seconds with hot oil having a temperature of at least $150°$ C.; and freezing the fried coated portion;

wherein both the bonding crumb and the coating crumb comprise a milled farinaceous dough extrudate containing 0.05-5 wt. % of added hydrocolloid.

According to a third aspect of the present invention, there is provided apparatus for carrying out the aforementioned method, the apparatus comprising:

a substrate forming apparatus arranged for forming portions of a solid or solidified substrate;

a coating apparatus, arranged to receive the substrate and to immerse the portions in a viscous aqueous coating composition to produce precoated portions;

a first crumb applicator, arranged to receive the precoated portions and to apply a layer of crumb onto the precoated portions to form crumb coated portions;

a batter coating applicator, arranged to receive the crumb coated portions and to immerse the crumb coated portions in a batter to produce batter coated portions;

a second crumb applicator, arranged to receive the batter coated portions and to apply a layer of crumb onto the batter coated portions to form multiple coated portions;

a fryer, arranged to receive the multiple coated portions and to immerse the multiple coated portions in hot oil to produce hot fried coated portions;

a cryogenic freezer, arranged to receive the hot coated portions and to cryogenically freeze the hot fried coated portions These and other features of the invention are further described and exemplified in the detailed description below.

DRAWINGS

The invention is further described by means of example but not in any limitative sense with reference to the accompanying drawings, of which:

DETAILED DESCRIPTION OF THE INVENTION

Figure 1:
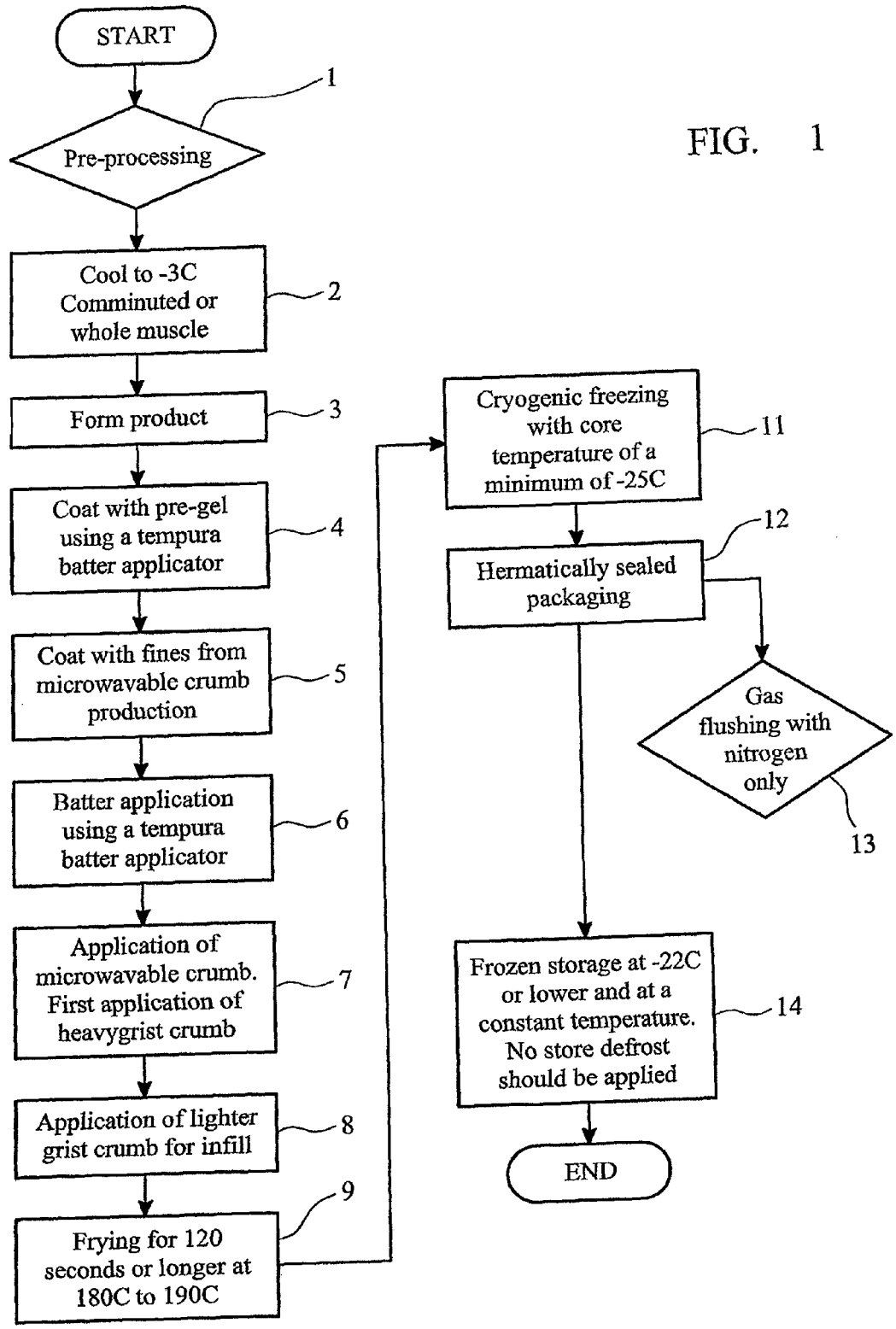
FIG. 1 is a flow chart illustrating steps of a method in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order to not unnecessarily obscure the present invention.

A first aspect of the present invention provides a frozen, microwaveable, coated food product comprising:

a core of cooked edible material having a weight equal to 15-95 wt. % of the food product, a fried coating that envelops the core of edible material and having a weight equal to 5-85 wt. % of the food product, said coating comprising at least three coating layers, including an inner crumb layer, an outer crumb layer and a batter layer that separates the inner crumb layer from the outer crumb layer;

wherein both the inner crumb layer and the outer crumb layer comprise a milled farinaceous dough extrudate containing 0.05-5 wt. % of added hydrocolloid.

The invention provides a microwaveable frozen product, that is a product which has been cooked before freezing and which can be reheated in a microwave or combination oven to give a satisfactory product with a succulent core and crisp crumb coating. Products of this invention may be also reheated using a conventional thermal oven.

The term "added hydrocolloid" as used herein refers to hydrophilic polymers that are not naturally present in the farinaceous component of the dough extrudate and that are capable of increasing the viscosity of an aqueous medium to which they have been added. These hydrophilic polymers are suitably selected from polysaccharides, modified polysaccharides and proteins.

The fried coating of the present food product may comprise one or more additional layers besides the two crumb layers and the batter layer. The coating may additionally comprise additional batter and/or crumb layers. Furthermore, the coating may advantageously contain a precoating layer located between the core of edible material and the inner crumb layer. Such a precoating layer may suitably be applied during the manufacture of the present food product in order to ensure that the milled extrudate of the inner crumb layer will stick to the core of edible material.

The core of cooked edible material preferably has a weight equal to 50-95 wt. % and the fried coating has a weight equal to 5-50 wt. % of the total weight of the food product The benefits of the present invention are particularly appreciated in embodiments in which the core of edible material contains an appreciable amount of water. During microwave reheating some of the water contained in the core of the product will turn into steam. Although we do not wish to be bound by theory, it is believed that the fried coating of the present product is permeable to the steam that is generated within the core of the product, but it hardly absorbs any of the steam, thus retaining its crisp nature. Typically the core of edible material contains at least 15 wt. %, more preferably at least 25 wt. % and most preferably at least 30 wt. % water. The water content of the core material normally does not exceed 90 wt. %.

The edible material comprised in the core of the coated food product suitably comprises fish, meat, poultry, shellfish, shrimps, dairy products (e.g. cheese), ragu, vegetable, fungi and combinations thereof. According to a particularly preferred embodiment animal material selected from fish, meat, poultry, shellfish, shrimps and combinations thereof represents at least 40 wt. %, even more preferably at least 60 wt. % and most preferably at least 80 wt. % of the core of edible material.

Preferably the core of edible material has a thickness not greater 50 mm, more preferably of not more than 15 mm, most preferably of not greater than 10 mm. This conveniently allows sufficient penetration of microwave radiation within a period of 2 to 3 minutes using the power available in a typical domestic microwave oven.

The coated food product of the present invention is suitably prepared by frying the product for a sufficiently long time to ensure that the edible material that makes up the core is fully cooked. Thus the product can simply be reheated in a microwave without the need of cooking it.

The use of a a hydrocolloid-containing milled dough extrudate in both the bonding crumb and the coating crumb coating offers the advantage that together with the batter layer, these crumb coatings form a shell which acts as a barrier to penetration of oil into the core of the portion during the period of frying. Thus, the two crumb layers made of the aforementioned milled dough extrudate produce a fully cooked fried product having a relatively low fat content. Surprisingly, this lower fat content has virtually no adverse effect on the eating quality of the coated food product that is obtained by the present method. Typically, the fried coating of the coated food product has a fat content that is substantially lower, for example at least 10% lower than that of a coated food product that is identical except for the fact that it was prepared using ordinary crumb. Preferably, the coating has a fat content of less than 20 wt. %, more preferably a fat content of 2-15 wt. %, and most preferably of 4-12. wt. %. Here the term fat refers to lipids selected from triglycerides, diglycerides, monoglycerides, free fatty acids and phospholipids.

The fried coating of the present food product possesses unique properties. Not only does this coating absorb little fat during frying, but it also may absorb a reduced amount of water. Furthermore, the fried coating may be very stable in the presence of humidity. This special quality explains why steam that is produced during microwave reheating of the edible core can escape from the product without causing the fried coating to become unacceptably soggy. Thus, the fried coating of the present food product typically has a water content of not more than 10 wt. %, more preferably of not more than 5 wt. % after microwave reheating. Here the water content refers to the water content after microwave reheating to a core temperature of 80° C.

The milled extrudate that is contained in the inner crumb layer typically has a mass weighted average particle size of less than 2 mm. More preferably, the milled extrudate in the inner crumb layer has a mass weighted average particle size of less than 1.8 mm, more preferably 0.1 to 1.5 mm, even more preferably 0.15 to 1 mm, and most preferably 0.25 to 0.9 mm.

Typically, the inner crumb layer has a weight of 1-20% of the weight of the fried product. Even more preferably, the inner crumb layer represents 2-10 wt. % most preferably 3-8 wt. % of the fried product.

The particle size distribution of the crumb and the milled extrudate can suitably be determined with the help of a set of sieves of different mesh in a manner well-known to a person skilled in the art.

The milled extrudate that is employed in the inner crumb layer preferably contains not more than a minor amount of particles having particle size in excess of 1.5 mm. Preferably, not more than 5 wt. % of the milled extrudate comprised in the inner crumb layer has a particle size of more than 1.5 mm, preferably of more than 1.2 mm.

The milled extrudate that is contained in the outer crumb layer preferably has a mass weighted average particle size of 0.5 to 3 mm, more preferably of 1 to 3 mm.

Typically, the outer crumb layer has a weight equal to 3-25 wt. % of the weight of the fried product. Even more preferably, the outer crumb layer has a weight of 5-15 wt. %, most preferably of 8-12 wt. % of the fried product, said percentages being dependent on the shape and dimensions of the product.

The milled extrudate that is employed in the outer crumb layer preferably contains not more than a small amount of fines. Typically, not more than 5 wt. % of the milled extrudate in the outer crumb layer has a particle size of less than 0.5 mm, preferably of less than 0.8 mm.

The inner and outer crumb layer of the frozen, microwaveable product may contain minor amounts of other crumb material besides the milled farinaceous dough extrudate. Preferably, the inner crumb layer contains at least 80 wt. %, most preferably at least 90 wt. % of the milled farinaceous dough extrudate. Likewise, the outer crumb layer contains at least 80 wt. %, most preferably at least 90 wt. % of the milled farinaceous dough extrudate.

Microwaveable products of particularly good quality can be obtained by employing a relatively fine milled extrudate in the inner crumb layer and a relatively coarse milled extrudate in the outer layer. Accordingly, in an especially preferred embodiment of the present food product, the milled extrudate that is contained in the outer crumb layer has a mass weighted average particle size that is at least 50% higher, more preferably at least 100% higher and most preferably 200% to 500% higher than the mass weighted average particle size of the milled extrudate that is contained in the inner crumb layer.

The hydrocolloid used in the milled extrudate may be any hydrocolloid which forms a gel or otherwise increases viscosity when mixed with water. Preferred hydrocolloids produce a milled extrudate which retains shape when stirred in water having a temperature of 20° C. for a period of 60 seconds. Use of a hydrocolloid may provide a degree of water resistance to the milled extrudate reducing any tendency to pick up moisture from adjacent layers or material. Typically, hydrocolloid is contained in the milled extrudate in a concentration of 0.06-4 wt. %, more preferably of 0.08-3 wt. % and most preferably of 0.1-3 wt. %.

Examples of hydrocolloids that may suitably be comprised in the milled farinaceous dough extrudate of the inner and outer crumb layer include natural gums, modified gums, gelatin, pectin, alginate, arabinogalactan, agar, carrageenan, furcellaran, xanthan, modified starch and combinations thereof. Preferably, the hydrocolloid is selected from natural gums and combinations thereof.

Examples of natural gums that may suitably be employed as a hydrocolloid in the milled farinaceous dough extrudate include guar gum, xanthan gum, locust bean gum, gum Arabic, tragacanth, gum karaya, gum ghatti, xanthan gum and combinations thereof.

Most preferably, the hydrocolloid is selected from guar gum, locust bean gum, xanthan gum and combinations thereof.

Advantageously, the milled extrudates employed in the bonding crumb and the coating crumb have the same composition.

The fried coating of the present food product preferably has an average thickness of 1 to 8 mm, more preferably of 1.5 to 5 mm and most preferably of 1.8 to 4 mm.

Another aspect of the invention comprises a method of producing a frozen, microwaveable, coated food product, said method comprising the steps of:
  providing a portion of a solid or solidified substrate;
  coating the portion with an aqueous precoating liquid to form a precoated portion;
  applying a coating of bonding crumb to the precoated portion to form a crumb coated portion;
  applying a batter to the crumb coated portion to form a batter coated portion;
  applying a coating of coating crumb to the batter coated portion to form a breaded portion;
  frying the breaded portion by contacting said breaded portion for at least 100 seconds with hot oil having a temperature of at least 150° C.; and
  freezing the fried coated portion;
  wherein both the bonding crumb and the coating crumb comprises a milled farinaceous dough extrudate containing 0.05-5 wt. % of added hydrocolloid.

The portions of solid or solidified substrate that are coated with the aqueous precoating liquid may be solid at ambient temperature or, alternatively, they may be liquid or paste-like at ambient temperature. In the latter case, i.e. if the substrate is not solid at ambient temperature, the substrate is cooled to a sufficiently low temperature to render it solid, before applying the precoating liquid.

Examples of food materials that can be employed to form the portion of substrate include fish, meat, poultry, shellfish, shrimps, dairy products (e.g. cheese), ragu and combinations thereof.

According to a preferred embodiment, the portions of solid substrate contain at least 30 wt. %, preferably at least 50 wt. % of animal tissue.

The present method may suitably be used to produce coated food products from portions of solid substrate have a weight in the range 5-300 g. Preferably, the portions of solid substrate have a weight in the range of 10 to 50 g.

Preferably the portion of substrate has a thickness not greater than 50 mm, more preferably not greater than 15 mm, most preferably of not greater than 10 mm.

The portions of the substrate may be whole portions, for example whole muscle portions such as individual steaks or fillets or larger pieces which may be cut into individual portions after cooking or reheating. Alternatively the pieces may comprise chopped or comminuted pieces, for example, nuggets or minced products which may be pressed or otherwise reconstituted into larger portions. Use of pieces with uniformly sized and weighted cores is preferred.

The solid or solidified substrate may be extruded into portions, for example on a wire mesh conveyor, using a die. The temperature of the extruded portions may be in the range of −6 to 6° C. preferably of −4 to −1° C. to stiffen the substrate to facilitate handling during the subsequent processing steps.

The substrate, especially if it is composed of chopped or comminuted pieces, is preferably impregnated with an aqueous or particulate stabiliser composition, for example by soaking, permeation or injection (for example vacuum pulse injection) into the substrate prior to forming into portions. Examples of suitable stabiliser compositions can be found in WO 97/03572, which is incorporated herein by reference. The substrate may be impregnated with the stabiliser composition to the extent that the ingredients penetrate at least the surface layer must be throughout of the substrate or preferably impregnate the bulk of the substrate structure. Impregnation may be achieved by soaking, permeation or injection into the substrate prior to forming into portions.

Application of the coating of bonding crumb is facilitated by the use of the aqueous precoating liquid since the crumb particles will not adhere sufficiently to a dry substrate. The application of the aqueous precoating additionally offers the advantage that it may reduce loss of moisture and uptake of oil by the substrate during frying due to stabilising properties of the aqueous composition. Use of a conventional predust in place of the aqueous composition would not cause the crumb to adhere sufficiently to the substrate.

The aqueous precoating liquid that is applied onto the portion of solid substrate typically contains at least 80 wt. %, preferably at least 90 wt. % of water. In order to minimize drip-off and to maximize adhesion of the crumb, the precoating liquid preferably has a minimum viscosity of 300 cP, measured using a Brookfield viscometer with a number 3 spindle at 60 rpm at 10° C. Even more preferably, said viscosity lies within the range of 350-450 cP, most preferably in the range of 380-420 cP.

The aqueous precoating liquid preferably contains 0.1-5 wt. %, more preferably 0.3-3 wt. % of dry matter. The precoating layer serves as an additional barrier to loss of moisture from the substrate during subsequent microwave heating. Without wishing to be bound by theory it is believed that the precoating layer serves as a barrier to fat pickup by the core, avoiding impairment of the flavour of the core. Impregnation of the core with a stabiliser composition as described herein before contributes to maintaining an optimum moisture content of the core during cooking or reheating.

The aqueous precoating liquid may be applied onto the portion of solid or solidified substrate by immersing said substrate in a bath containing the aqueous precoating liquid or by spraying or brushing said precoating liquid onto the portion. Preferably, the precoating liquid is applied by immersing it in a bath of precoating liquid, e.g. by passing the portion through such a bath with the help of a conveyor belt. The term "bath" refers to any convenient receptacle, trough or container suitable for holding a liquid.

The bonding crumb employed in the present method typically has a mass weighted average particle size of less than 2 mm. More preferably, the bonding crumb has a mass weighted average particle size of 0.1 to 1.5 mm, even more preferably 0.15 to 1 mm, and most preferably 0.25 to 0.9 mm.

The bonding crumb preferably contains not more than a minor amount of particles having particle size in excess of 1.5 mm. Preferably, not more than 5 wt. % of the milled extrudate in the inner crumb layer has a particle size of more than 1.5 mm, preferably of more than 1.2 mm.

The batter that is applied to the crumb coated portion in accordance with the present method preferably comprises calculated by weight of dry matter, 20-55 wt. % starch; 20-55 wt. % flour; and 3-20 wt. % egg solids. Examples of batter formulations that may suitably be employed in the present process are described in WO 96/32026. The starch contained in the batter may have been introduced into the batter by a flour component or it may have been added as a purified starch ingredient, e.g. high amylose starch.

The batter mixture is preferably mixed using a high shear mixer for example a Silverson High Shear DX batch mixer with a slotted head. An inline mixer may be employed.

Typically, the batter has a viscosity of 200-1000 cP, more preferably of 300-800 cP, most preferably of 500-600 cP, measured using a Brookfield viscometer with a number 3 spindle at 60 rpm when it is applied to the crumb coated portion.

The batter may be applied onto the crumb coated portion by an apparatus comprising a bath containing the batter through which the crumb coated portion is passed by means of a conveyor. A tempura applicator is preferred, that is a bath containing circulating batter through which a conveyor passes. for example. TempuDipper™ (CFS) although one may also use a curtain-type for example WetCoater™ (CFS) applicator or other convenient apparatus.

The coating crumb employed in the present method typically has a mass weighted average particle size of 0.5 to 3 mm, more preferably 1 to 3 mm.

The coating crumb preferably contains not more than a small amount of fines. Typically, not more than 5 wt. % of the milled extrudate in the outer crumb layer has a particle size less than 0.5 mm, preferably less than 0.8 mm.

As explained above, advantageously the coating crumb has a larger particle size than the bonding crumb. Preferably, the coating crumb has a mass weighted average particles size that is at least 50% higher than the mass weighted average particle size of the bonding crumb.

The bonding crumb and coating crumb employed in the present method may suitably be produced by the process described in WO 2010/001101, which is incorporated herein by reference for all purposes. According to a particularly preferred embodiment, the bonding crumb and the coating crumb are produced by separating the farinaceous dough extrudate after milling into a fine fraction and a coarse fraction, for example by sieving, using a sieve having a mesh of 0.5-2 mm, preferably of 0.7-1.4 mm. The fine fraction so obtained is preferably applied as bonding crumb, whereas the second fraction is suitably applied as coating crumb.

The bonding crumb and coating crumb employed in the present method preferably have the composition described herein before in relation to the milled extrudate that is contained in the inner and outer crumb layer of the microwaveable coated food product.

According to another preferred embodiment, the bonding crumb and coating crumb employed in the present method have the same composition.

The one or more coatings of crumb together typically represent 5-80 wt. %, preferably 15-50 wt. % of the fried portion.

The present method may suitably employ a crumb coating apparatus that comprises a first conveyor and a second endless conveyor located below an end of the first conveyor, and beneath a flow of fine crumb particles so that portions fall from the first conveyor onto a layer of particles on the second conveyor. The second conveyor may pass through a curtain of fine crumb falling onto the conveyor surface so that the portion falls onto the crumb causing the crumb to adhere to the surface layer of the aqueous precoating, and is then coated by the falling curtain of crumb particles. The apparatus may comprise a dispenser having an outlet extending across of the conveyor to provide the curtain of fine crumb extending across the path of the portions on the conveyor. A roller may be located above the conveyor on the exit side to bear on the coated portion to improve adhesion of the fine crumb.

Crumb may be applied in excess to the portion using a crumb applicator for example a CrumbMaster™ (CFS). The crumb coated portion may be passed through a roller to improve adhesion.

The total amount of aqueous precoating liquid, batter and crumb that is applied onto the portion in the present method is preferably such that, after frying, the fried portion has a weight that exceeds the weight of the uncoated portion of solid substrate by 25-100%, preferably by 30-60%.

The breaded portion is fried to cook the substrate and coating layers. The period of cooking is preferably sufficient to completely cook the substrate preventing any health risk in the event that a frozen product is insufficiently reheated from the frozen state in a microwave oven. A comparatively long period of reheating in a microwave oven is undesirable since the substrate is heated from the inside by the microwave energy resulting in a loss of moisture. This may lead to a dry core and damage to the coating layers.

A homogeneous outer crumb coating, with none of the underlying batter layer being exposed is advantageous to provide a uniformly browned appearance after a prolonged period of frying. This may be compared to a shorter period of frying as commonly used for conventionally thermally cooked breaded products.

The bonding crumb that is bound by the aqueous precoating may form a stabilising thermal barrier underlying the batter layer and the second coating of crumb may provide a barrier to escape of moisture and ingress of oil during a prolonged frying stage. The coating layers may also serve to protect the surface of the substrate from excessive local heating during frying.

For conventional thermally cooked breaded products such as chicken nuggets, a short period of frying for example 90 seconds or less has been followed by a further period of cooking in a hot air oven. This is disadvantageous for microwave cookable products because the core of the substrate may not be thoroughly cooked during reheating from the frozen state. Prolonged heating of conventional products in a microwave oven leads to excessive loss of moisture and consequent damage to the coating layers.

During the frying step the breaded portion, optionally after having been coated with one or more additional crumb layers, is preferably contacted with the hot oil for 120-300 seconds, more preferably for 130-240 seconds, most preferably for 140-180 seconds.

The hot oil that is used for frying the breaded portion preferably has a temperature of 160-200° C., more preferably 170-195° C. and most preferably 175-190° C.

The oil employed preferably is a vegetable oil. The term "vegetable oil" encompasses non-modified vegetable oils, hydrogenated vegetable oils, fractions of vegetable oils (for example olein or stearin fractions), interesterified vegetable oils and combinations thereof.

Preferably the core temperature of the fried portion is greater than 72° C., more preferably greater than 74° C.

Frying in accordance with this invention is advantageous in comparison to flash frying followed by hot air cooking as the latter may not give a coating with desired hardness without moisture loss from the core. However a hot air oven such as an oven belt cooker, may be used to further cook larger products in cases where the frying time is insufficient to fully cook the products, for example for bone-in products or whole muscle products such as chicken breast fillets.

The breaded portion is suitably fried by immersing the breaded portion in the hot oil, for example by passing it through a bath of hot oil by means of a conveyor belt. The frying apparatus preferably comprises a double layer of parallel endless belts both layers passing beneath the oil surface, a portion carried on the lower layer being prevented from floating during frying by contact with the upper layer. The belt may comprise wire screens or other perforated configurations.

It has been found that in order to produce a frozen coated food product that, although it comprises a moist core, can be heated in a microwave or combination oven to yield a ready-to-eat hot product with a crunchy coating, the freezing conditions employed in the process are important. More specifically, it has been found that the core temperature of the fried coated portion should be reduced very quickly after frying, i.e. when the core temperature of the fried portion is still high. Although we do not wish to be bound by theory, it is believed that rapid freezing of the fried portion enhances the structural integrity of the product, reduces formation of ice crystals and reduces the size of any ice particles which may be formed within the products. If ice crystals are present in a battered breaded product they can become superheated in a microwave oven creating hot spots in the core. Also migration of ice crystals on storage can lead to a build up of localised ice which on heating can result in release of excessive moisture near to the surface coating.

In a particular preferred embodiment of the present method, the fried coated portion that is produced by the frying of the breaded portion has a core temperature in excess of 70° C. and is frozen by introducing said fried portion into a freezer before the core temperature of the fried coated portion has fallen to a temperature of 50° C., and said core temperature is reduced in the freezer to less than −15° C., using cryogenic freezing.

In accordance with a particularly preferred embodiment, the fried coated portion has a core temperature of more than 65° C., preferably of more than 70° C. when it is introduced into the freezer.

The cryogenic freezing of the fried coated portion in the present method suitably comprises contacting said fried portion with a liquid gas, more preferably a cryogen, especially liquid nitrogen.

According to a particularly preferred embodiment, the fried portion has a core temperature of at least 50° C., more preferably of at least 60° C., even more preferably of at least 65° C. and most preferably of at least 70° C. when it is contacted with the liquid gas.

Preferably, the fried portion is contacted with a liquid gas until the core temperature of the portion is less than −15° C., more preferably less than −20° C. and most preferably less than 22° C.

The core temperature of the fried coated portion preferably does not decrease by more than 25° C., more preferably by not more than 20° C. and most preferably by not more than 15° C. before the fried portion is placed in the freezer, more preferably before it is contacted with liquid gas.

The frozen products are suitably packaged for storage and distribution. Packaging under an inert atmosphere for example nitrogen is preferred.

The frozen product may be reheated or cooked from the frozen state before use using an oven selected from: a microwave oven, a conventional oven or grill, deep or shallow fried, or an oven using a combination of microwave and conventional heating.

A further aspect of the invention provides an apparatus for producing a frozen coated food product in accordance with the first aspect of this invention, said apparatus comprising:

a substrate forming apparatus arranged for forming portions of a solid or solidified substrate;

a coating apparatus, positioned downstream of the substrate forming apparatus, arranged for immersing the portions in a viscous aqueous coating composition to produce pre-coated portions;

a first crumb applicator, positioned downstream of the coating apparatus, arranged for applying a layer of crumb onto the precoated portions to form crumb coated portions;

a batter coating applicator, positioned downstream of the crumb applicator, arranged for immersing the crumb coated portions in a batter to produce batter coated portions;

a second crumb applicator, positioned downstream of the batter coating applicator, arranged for applying a layer of crumb onto the batter coated portions to form multiple coated portions;

a fryer, positioned downstream of the second crumb applicator, arranged for immersing the multiple coated portions in hot oil to produce hot fried coated portions; and a cryogenic freezer, positioned downstream of the fryer, arranged to receive and rapidly freeze the hot fried coated portions.

Figure 2:
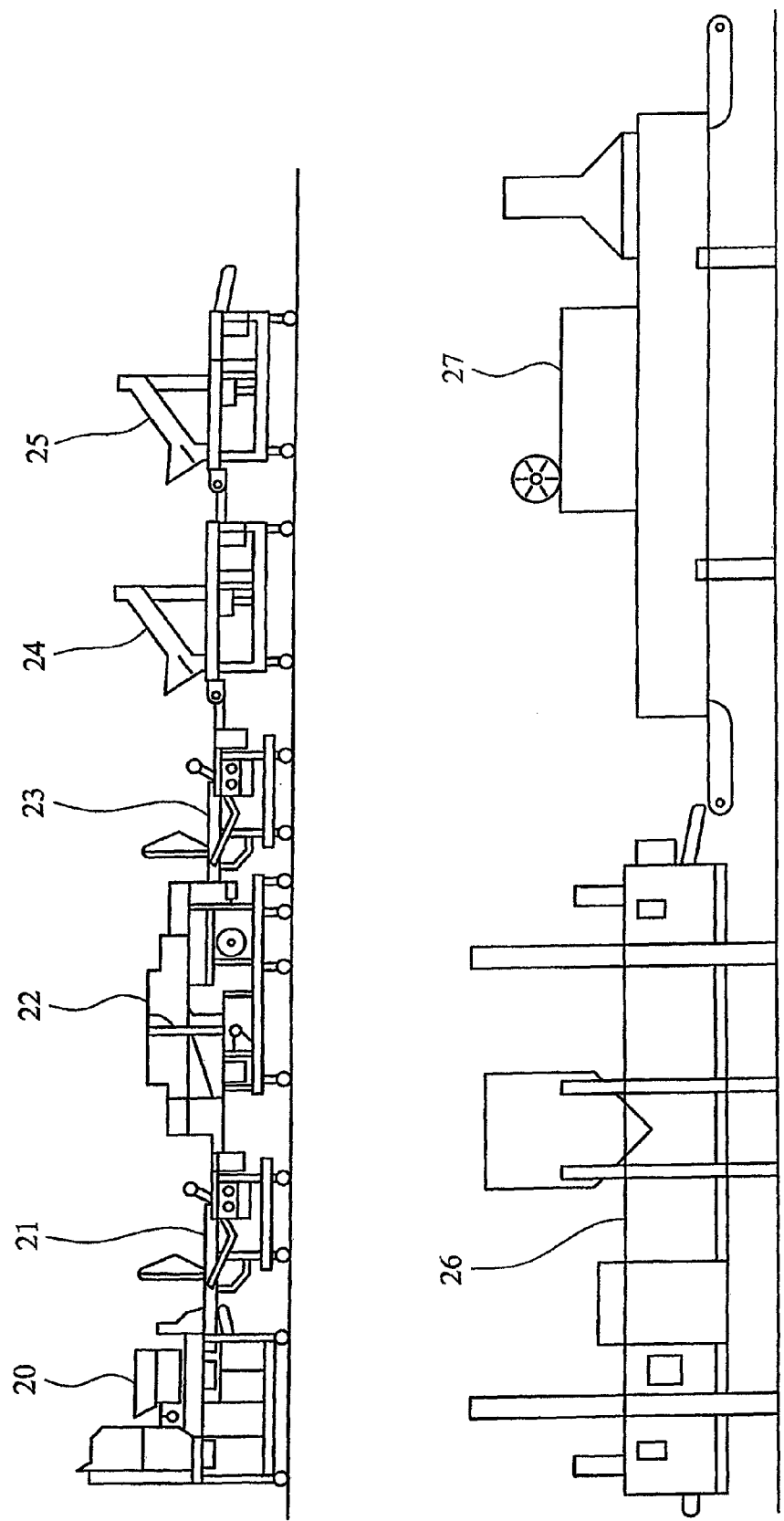
FIG. 2 is a side elevation of apparatus in accordance with this invention.

FIG. 1 is a flow chart illustrating stages of the method of an embodiment of this invention. The apparatus is shown in side elevation in FIG. 2 and component parts are shown in more detail in FIGS. 3 to 5.

In a pre-processing stage (1), pieces of chicken or other substrate are cut to an appropriate size or comminuted as required. The substrate pieces are impregnated with a stabiliser composition, as described in Examples 1 and 2. A forming machine (20) is used to form the product (3). A conventional forming machine may be arranged to extrude chicken substrate pieces having a predetermined thickness and one or more shapes. The pieces are extruded onto a conveyor arranged to carry them to a tempura dipper containing an aqueous coating composition as described in Example 3 to form a pre-coated product (4).

Figure 3:
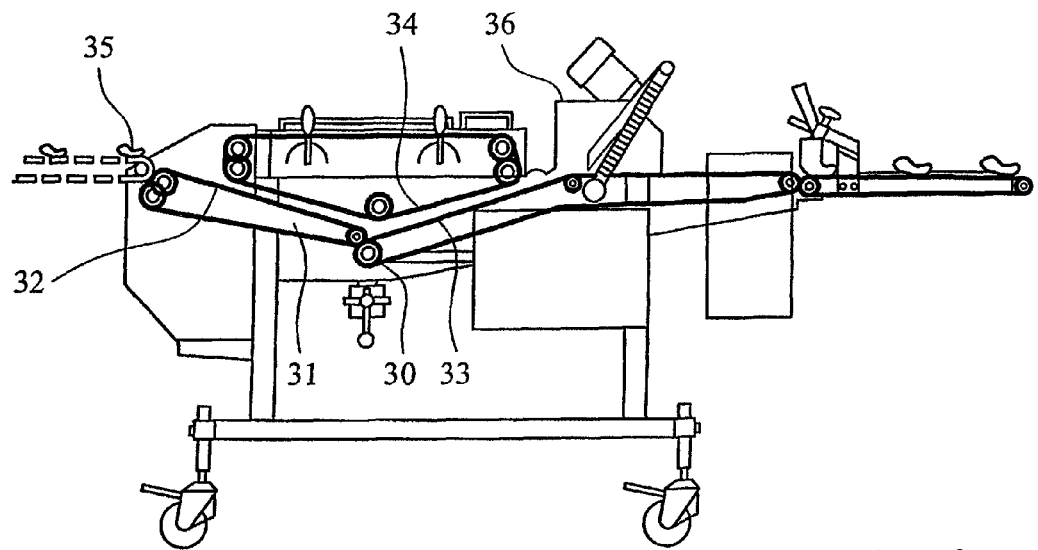
FIG. 3 is a cross sectional view of a coating apparatus.

The tempura coating apparatus is shown in FIG. 3. This comprises a reservoir (30) for an aqueous coating composition or pre-gel (31). A first lower conveyor (32) carries pieces (35) beneath the surface of the aqueous composition. A second upper conveyor (34) prevents the pieces (35) from floating. This ensures complete coating of the pieces. The upper and lower conveyors are disposed in parallel spaced relation to form a channel within which the pieces are located during coating.

A second lower conveyor (33) carries the substrate pieces out of the reservoir beneath the upper conveyor (34). The substrate pieces emerging from the reservoir pass under an air jet (36) to remove excess liquid.

Following application of the pre-gel or aqueous coating (4) a coating of crumb fines is applied (5) using a crumb applicator.

The fine crumb coated substrates are then passed through a tempura batter applicator (6) to apply batter followed by application of the outer crumb. The batter mixture is prepared in a mixing tank with a high shear mixer and a heating system to maintain a temperature of 42° C. for 30 minutes. The mixture is then transferred to a holding tank maintained at 3° C. to 4° C. with the viscosity being adjusted as necessary be addition of water before being pumped to the tempura-type applicator.

The batter coating may be applied using a tempura coating apparatus of the kind shown in FIG. 3. The substrate pieces which have been coated with aqueous coating and crumb fines are passed through a bath of the batter using a wire mesh conveyor, so that complete immersion of the pieces is achieved.

A first layer of heavy grist crumb may be applied (7) to the batter coated product followed by a lighter grist crumb to infill between the heavy crumb particles (8). Alternatively, a single outer crumb layer may be employed, particularly when using a large sized outer crumb.

Where two outer crumb layers are used, a first coating of outer crumb may be applied using a conventional crumb applicator. The crumb is preferably sieved to remove fines and small particles. A second coating of outer crumb may be applied to ensure complete covering of the battered substrate.

The crumb coated product is then passed (9) through an elongate reservoir containing heated oil to fry the products.

A frying time of 2 minutes 20 seconds was used although this may be varied dependent on the weight and size of the particles. After frying the core temperature of the products was in the range 74° C.-85° C. A small loss of weight was observed due to loss of water from the substrate but this is mostly compensated for by an uptake of oil.

Following frying the hot fried products were directly without delay passed using a conveyor into a cryogenic freezer so that the core temperature of the fried products is reduced to a maximum of −25° C., usually −30° C. to −35° C. or lower during a period of 30 minutes or less.

Figure 5:
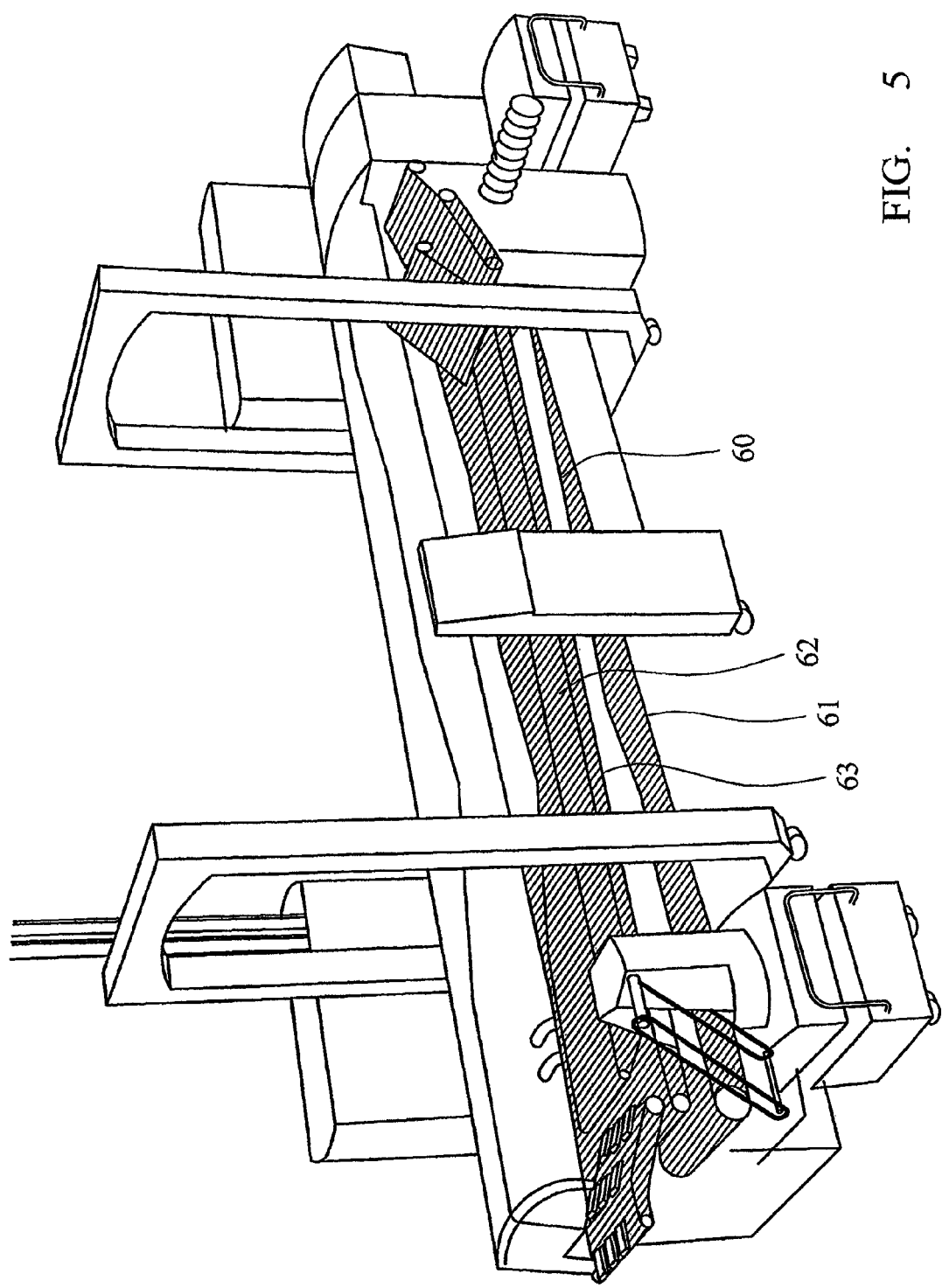
FIG. 5 is a cut away perspective view of a fryer.

The construction of the fryer is shown in detail in FIG. 5. The elongate reservoir of the fryer contains rapeseed oil that is heated to a constant temperature of 180° C. to 188° C. Pure rapeseed oil is employed.

The frozen products were packaged in hermetically sealed packages (12). The packing may be flushed with nitrogen (13) although this may not be used dependent on the required shelf life of the packaged products.

The crumb was prepared as disclosed in WO 2010/001101, the disclosure of which is incorporated herein by reference for all purposes.

EXAMPLES

The following examples provide details illustrating aspects of embodiments of the present invention. These examples are provided to exemplify and more clearly illustrate aspects of the present invention and in no way intended to be limiting.

Example 1

Stabiliser Composition

A stabiliser composition was prepared using the following ingredients:

| Ingredient | % |
| --- | --- |
| cellulose gum (Methocel ™ A4M) | 15.0 |
| modified starch (Thermflo ™) | 24.0 |
| polydextrose | 40.0 |
| xanthan gum | 6.0 |
| egg albumen | 15.0 |
| Total | 100.0 |

The composition was dissolved in water to produce a solution with a concentration suitable to stabilise the particular substrate in use. To this end the dry powder mixture was partially hydrated in a tub and then poured into a bowl chopper. The bowl chopper was then run for two to three minutes until the mixture was fully hydrated. The mixture can be hydrated directly in the bowl chopper if required. Alternatively, the stabiliser may be hydrated using a high shear mixer fitted with a general purpose head.

This general purpose formula may be modified to increase its efficiency in specific substrates. The above formula may be modified by addition of citric acid (up to 1%) and ascorbic acid (up to 2%) with the polydextrose (Litesse II (Trade Mark)) being reduced accordingly.

Example 2

Impregnation of Substrate with Stabiliser Composition

A chicken mixture for chicken dippers or nuggets was prepared with the following composition which was prepared as a dry mixture, as an alternative to use of a hydrated stabiliser composition. The stabiliser of Example 1 was used.

| | |
|---|---|
| chicken emulsion | 20% |
| skin—3 mm | 18% |
| chicken breast—10 mm | 50% |
| water | 2% |
| rusk | 2% |
| stabiliser (Example 1) | 5% |
| seasoning | 3% |
| | 100% |

The chicken breast was chilled to −3° C. and minced using a 10 mm plate. After mincing, the temperature was 0-3° C. Water was added with mixing. A chicken emulsion comprising the following ingredients was added with mixing:

| | |
|---|---|
| chicken skin | 44% |
| water | 44% |
| soya isolate | 11% |
| salt | 1% |
| | 100% |

The stabiliser in accordance to Example 1 was added and mixed thoroughly. Rusk was added with mixing following by seasoning. A dry powder flavouring was preferred. The composition was allowed to dissolve in use in water which was present in the substrate in order to form an aqueous stabiliser solution in situ. (Stage 1)

A vacuum was applied to the mixture to consolidate the structure following which the chicken mixture was chilled to −3° C. (Stage 2) and formed into shaped pieces (Stage 3).

A similar procedure was used for other comminuted meat products. Large particulate cores may be manufactured using a similar method.

Example 3

Aqueous Coating Composition

The following mixture was prepared:

| | |
|---|---|
| modified starch (Thermflo) | 35% |
| thickener (Methocel A4M) | 25% |
| xanthan gum | 25% |
| egg albumen | 15% |
| | 100% |

The mixture was dissolved in water to form a 1% solution using a CFS Scanbrine mixer with paddle agitation. The solution was left to stand for 24 hours to form a fully hydrated gel or viscous solution.

A pump is necessary to run the machine but after a short while bubbles may form in the gel solution in the applicator. To prevent this problem food grade anti foaming agents can be used. Polydimethylsiloxane is preferred but calcium alginate, methyl ethyl cellulose, methylphenylpolysiloxane or polyethylene glycol can be used.

Example 4

Batter Coating Composition

A batter coating composition was prepared by mixing the following ingredients:

| Ingredient | % |
|---|---|
| Soya flour (Hisoy) | 31.0 |
| high amylase starch (Hylon 7) | 48.0 |
| cellulose gum (Methocel A4M) | 2.0 |
| whole egg (Henningsen W1) | 13.0 |
| D-xylose | 3.0 |
| monosodium phosphate | 1.9 |
| ammonium bicarbonate | 0.7 |
| glucono D-lactone | 0.7 |
| sodium acid pyrophosphate | 0.3 |
| alpha-amylase | 0.1 |
| | 100.00 |

The batter was mixed in batches using a Silverson DX high shear mixer on a gantry with a slotted disintegrating head. Batches were mixed in the ratio of 25 kilos water to 12.5 kilos dry batter powder in a vat with a diameter of 68 cm. Thereafter, the mix was diluted as required for example to give a ratio of water:powder of 2.4:1.

In full scale production the batter ingredients were mixed in a ratio of water:powder of 2.4:1 using two 200 liter stainless steel vessels linked by a pump and an inline Silverson mixer with a high shear slotted disintegrating head. One tank was fitted with a paddle and was filled with water at 15-20° C. The dry ingredients were added to the water and wetted by rotation of the paddle. The second tank was fitted with a cooling jacket and a return pipe to the first vessel. The batter mixture was circulated through the high shear head until a temperature of 42° C. was reached by mechanical heat transfer. External heating may be employed to avoid a tendency to over shear the starch. When 42° C. was reached, the mixing and enzymolyis were complete. The batter was transferred to the second vessel and cooled. A heat exchanger may be used to cool the mixture. After cooling, the batter was pumped into a tempura type batter applicator.

The viscosity in the batter mixture was in the range 550-650 cP as measured by a number 3 spindle at 60 rpm. The batter was found to give a good rate of pickup and a crisp coating after frying.

Example 5

Preparation of Crumb

A hydrocolloid containing crumb was produced by extrusion of a farinaceous dough mixture as disclosed in WO2010/001101.

A flour composition was prepared as follows:

| flour mixture | 96.4% |
|---|---|
| sodium bicarbonate (Bex baking powder) | 2.0% |
| glyceryl monostearate | 0.6% |
| salt | 1.0% |
| | 100.0% |

The gelling agent was as follows:

| guar gum | 67.00% |
|---|---|
| sodium metabisulphite | 33.00% |
| | 100.00% |

The gelling agent was hydrated at 3% in 97% water. This was done using a high shear mixer. The hydrated mix was left to stand for at least 12 hours after mixing.

Hutchinsons Golden cake flour (150 kg per hour) was mixed with water (35 kg per hour) to form a slurry. The slurry was fed into a Clextral twin-screw extruder. The hydrated gelling agent was injected into the flat zone of the extruder in an amount of 7.5% (13.88 kg per hour). The extruded mixture was chopped into pieces and allowed to expand to form a bubble. When dried to a moisture content of 2% w/w the bulk density was 150 g·l$^{-1}$. The bubble was dried and milled and the resulting crumb was short and crisp. Application to a food substrate made a hard crumb coating. The dried bag product had a shelf life exceeding 12 months.

After extrusion the extrudate was milled and sieved to produce crumb particles of the desired size which passed through a 4 mm sieve but were retained by a 3 mm sieve. Crumb fines which passed through a 1 mm sieve resultant from milling of larger crumb particles were used in application as a fine crumb layer to the substrate pieces coated with the aqueous coating.

Example 6

Production of Microwaveable Frozen Chicken Nuggets

Stabilised substrates prepared in accordance with Example 2 were coated with an aqueous coating composition as described in Example 3. A fine crumb coating as described in Example 5 was applied followed by a batter coating as described in Example 4.

Next, a coating of the coarse crumb of Example 5 (particle size 3-4 mm) is applied using a CrumbMaster applicator (24) manufactured by CFS, Bakel, Netherlands.

Figure 4:
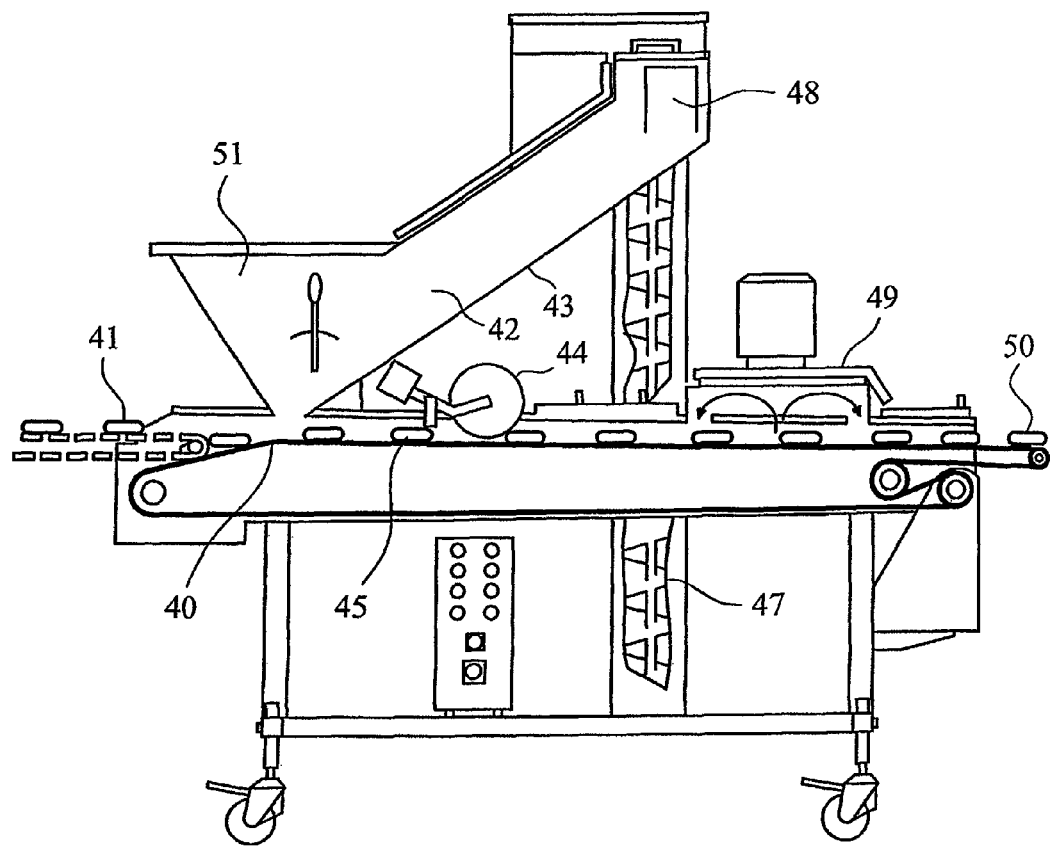
FIG. 4 is a cross sectional view of a crumb coating apparatus.

The crumb applicator is shown in cross sectional view in FIG. 4.

An endless conveyor (40) passing over a guide plate (46) receives battered substrate pieces (41). A supply of 2 mm crumb (42) contained in hopper (43) has an outlet extending across the width of the conveyor (40). Additional crumb may be added through inlets (51). Excess crumb (45) passing through the chain link conveyor (40) is collected by screw lift (47) and ejected into the top (48) of the hopper (43). A roller (44) serves to compress the crumb onto the surface of the substrate particles. An air blower (49) removes excess crumb from the coated particles, following which the particles (50) pass to a second crumb application station (Stage 8) for application of lighter grist crumb for infill between the larger crumb applied in Stage 7. The configuration of the batter crumb applicator (25) is similar to that of the first crumb applicator (24).

Following application of the first and second crumb layers the coated substrates enter a fryer (26). The construction of the fryer is shown in detail in FIG. 5.

Heated oil (60) contained in an elongate reservoir (61) is heated to a constant temperature of 180 to 188° C. Pure rapeseed oil is employed.

Parallel upper and lower conveyors (62, 63) prevent the substrate pieces from floating during passage through the fryer. A frying time of 2 minutes 20 seconds may be used although this may be varied dependent on the weight and size of the particles. After frying the core temperature of the particles was in the range 74-85° C. A small loss of weight was observed due to loss of water from the substrate but this is mostly compensated for by an uptake of oil.

Following frying, the fried products are transferred directly and without delay to a freezing station.

The fried products when removed from the heated oil had an external temperature of about 180° C. and a core temperature of about 90° C. The products were transferred by the conveyor into a cryogenic freezer during a period of not less than 2 minutes. During this time the temperature of the outer crumb was reduced due to contact with the atmosphere but the temperature of the core may for a brief period due to transfer of heat from the outer crumb layer to the core. On entry into the freezer the core temperature may be between 70° C. and 100° C., generally about 75° C.

The fried product of Stage 9 was immediately transferred in Stage 10 to a cryogenic freezer which reduced the core temperature to a maximum of −25° C., preferably −30° C. The time from the removal from the fryer to entry into the freezer was less than 2 minutes.

The transfer from the fryer to the freezer is arranged so that the core temperature of the product was reduced from 75° C. to −30° C. during a period not longer than 15 minutes.

The invention claimed is:

1. A microwaveable, frozen, fried, coated food product which substantially prevents steam generated during microwave heating of a core of edible material from drying out the core of edible material and making the coated food product soggy the microwaveable frozen, fried, coated food product comprising:

the core of cooked edible material having a weight equal to from 15 to 95 weight percent of the food product and having a water content of at least 15 weight percent and not more than 90 weight percent;

a fried coating that envelopes the core of edible material and has a weight equal to from about 5 to 85 weight percent of the total weight of the food product and a water content of not more than 10 weight percent after microwave reheating, said fried coating comprising at least three coating layers, including:

an inner crumb layer dispersed on the core of cooked edible material wherein the inner crumb layer comprises dried and milled farinaceous dough extrudate containing from 0.05 to 5 weight percent of guar gum;

a batter layer dispersed on the inner crumb layer wherein the batter layer comprises flour; and a crispy outer crumb layer dispersed on the batter layer wherein the crispy outer crumb layer comprised dried and milled farinaceous dough extrudate containing from 0.05 to 5 weight percent of co-extruded guar gum; and wherein use of the guar gum containing milled farinaceous dough extrudate in both the inner crumb layer and the crispy outer crumb layer, together with the batter layer causes the crumb coatings to form a shell which acts as a barrier to penetration of oil into the core of edible material producing a fully cooked, fried product, and wherein steam produced during microwaving escapes from the product without causing the outer crumb layer to become soggy.

2. A food product according to claim 1, wherein the milled extrudate that is contained in the inner crumb layer has a mass weighted average particle size of less than 2 mm and wherein the crispy outer crumb layer has a fat content of less than 20 weight percent fat wherein the fat is selected from the group consisting of triglycerides, diglycerides, monoglycerides, free/fatty acids, phospholipids and combinations thereof.

3. A food product according to claim 1 wherein the milled extrudate that is contained in the inner crumb layer has a mass weighted average particle size of 0.1 to 1.5 mm and the overall inner crumb layer has a weight of from 3 to 8 weight percent of the fried product.

4. A food product according to claim 3, wherein not more than 5 weight percent of the milled extrudate that is contained in the inner crumb layer has a particle size more than 1.5 mm.

5. A food product according to claim 4, wherein the milled extrudate that is contained in the outer crumb layer has a mass weighted average particle size of 0.5 to 3 mm.

6. A food product according to claim 5, wherein not more than 5 weight percent of the milled extrudate in the outer crumb layer has a particle size of less than 0.5 mm and the outer crumb layer contains at least 80 weight percent milled farinaceous dough extrudate.

7. A food product according to claim 1, wherein the milled extrudate that is contained in the outer crumb layer has a mass weighted average particle size that is at least 50% higher than the mass weighted average particle size of the milled extrudate that is contained in the inner crumb layer.

8. A food product according to claim 1, wherein the fried coating has an average thickness of from 1 to 8 mm.

9. A food product according to claim 1, wherein the outer crumb layer contains at least 90 weight percent milled farinaceous dough extrudate.

10. A food product according to claim 1, wherein the fried coating after microwave reheating has a water content of not more than 5 weight percent.

11. A method of producing a frozen, microwaveable, fried, coated food product which substantially prevents steam generated during microwave reheating from drying out a core of edible material and making the fried, coated food product soggy, by producing a core of edible material having a water content of at least 15 weight percent and not more than 90 weight percent and a crispy exterior with a water content of not more than 10 weight percent after microwave reheating; the frozen, microwavable, coated food product being produced by a method comprising the steps of:
providing a portion of a solid or solidified substrate;
coating the portion with an aqueous precoating liquid to form a precoated portion, the aqueous precoating liquid comprising:
a thickener; xantham gum; and egg albumen; wherein the aqueous precoating liquid comprises from 0.1 to 5 weight percent dry matter;
applying and adhering a coating of bonding crumb to the precoated portion to form a crumb coated portion wherein the bonding crumb contains dried and milled farinaceous dough extrudate containing 0.05 to 5 weight percent of co-extruded guar gum;
applying a batter comprising flour and water to the crumb coated portion to form a batter coated portion;
applying a coating of coating crumb to the batter coated portion to form a breaded portion wherein the coating crumb contains dried and milled farinaceous dough extrudate containing 0.05 to 5 weight percent of co-extruded guar gum;
frying the breaded portion by contacting said breaded portion for at least 100 seconds with hot oil having a temperature of at least 150° C.; and
rapidly freezing the fried coated portion after frying, while a core temperature of the fried coated portion is still high in order to enhance the structural integrity of the coated food product; and
wherein using the hydrocolloid-containing milled dough extrudate in both the bonding crumb and the and the coating crumb layer, together with the batter coated portion causes the bonding and coated crumb coatings to form a shell, which acts as a barrier to penetration of oil into the substrate, and wherein steam produced during microwave heating escapes from the product without causing the coating crumb to become soggy.

12. A method according to claim 11, wherein the aqueous precoating liquid has a minimum viscosity of 300 cP, measured using a Brookfield viscometer with a number 3 spindle at 60 rpm at 10° C.

13. A method according to claim 11, wherein the method yields a frozen, microwaveable, coated food product in which:
the core of cooked edible material has a weight equal to from 15 to 95 weight percent of the food product;
the fried coating that envelopes the core of edible material has a weight equal to from 5 to 85 weight percent of the total weight of the food product.

14. The food product according to claim 1, wherein the mass weighted average particle size of the outer crumb layer is at least 50% higher than the mass weighted average particle size of the milled extrudate contained in the inner crumb layer.

15. The method of claim 11, wherein the mass weighted average particle size of the outer crumb layer is at least 50% higher than the mass weighted average particle size of the milled extrudate contained in the inner crumb layer.

16. The food product according to claim 1, wherein the mass weighted average particle size of the outer crumb layer is from about 200% to about 500% higher than the mass weighted average particle size of the milled extrudate contained in the inner crumb layer.

17. The method of claim 11, wherein the mass weighted average particle size of the outer crumb layer is from about 200% to about 500% higher than the mass weighted average particle size of the milled extrudate contained in the inner crumb layer.

18. The food product of claim 1, wherein the inner crumb layer and the outer crumb layer have the same composition.

19. The food product of claim 1, wherein an aqueous precoating liquid is disposed between the core of edible material and the inner crumb layer on the core of edible material and the aqueous precoating liquid adheres the inner crumb layer to the core of edible material and comprises from 0.1 to 5 weight percent dry matter.

20. The food product of claim 18, wherein the batter comprises from 20 to 55 weight percent starch; from 20 to 55 weight percent flour; and from 3 to 20 weight percent egg solids (weight percent based ingredient weight) and the batter has a viscosity of from 200 to 1000 cP measured using a Brookfield viscometer with a number 3 spindle at 60 rpm when it is applied to the bonding crumb.

* * * * *